(12) United States Patent
Sarikaya (10) Patent No.: US 7,941,663 B2
(45) Date of Patent: May 10, 2011

(54) AUTHENTICATION OF 6LOWPAN NODES USING EAP-GPSK

(75) Inventor: Behcet Sarikaya, Wylie, TX (US)

(73) Assignee: FutureWei Technologies, Inc., Plano, TX (US)

( * ) Notice: Subject to any disclaimer, the term of this patent is extended or adjusted under 35 U.S.C. 154(b) by 824 days.

(21) Appl. No.: 11/877,534

(22) Filed: Oct. 23, 2007

(65) Prior Publication Data

US 2009/0103731 A1 Apr. 23, 2009

(51) Int. Cl.
*H04L 9/32* (2006.01)
*H04K 1/00* (2006.01)
*G06F 7/04* (2006.01)
*G06F 15/16* (2006.01)
*G06F 17/30* (2006.01)
*H04L 29/06* (2006.01)

(52) U.S. Cl. ............... 713/169; 713/171; 726/4; 726/5; 380/247; 380/270

(58) Field of Classification Search .................. 713/169, 713/171; 380/247, 270
See application file for complete search history.

(56) References Cited

U.S. PATENT DOCUMENTS

| | | | |
|---|---|---|---|
| 2006/0159260 A1 | 7/2006 | Pereira et al. | |
| 2006/0209789 A1 | 9/2006 | Gupta et al. | |
| 2006/0240802 A1* | 10/2006 | Venkitaraman et al. | 455/411 |
| 2007/0016780 A1* | 1/2007 | Lee et al. | 713/171 |
| 2007/0058634 A1 | 3/2007 | Gupta et al. | |
| 2007/0162751 A1* | 7/2007 | Braskich et al. | 713/169 |
| 2007/0180247 A1* | 8/2007 | Leech | 713/171 |
| 2007/0186105 A1 | 8/2007 | Bailey et al. | |
| 2008/0016350 A1* | 1/2008 | Braskich et al. | 713/169 |
| 2008/0259902 A1* | 10/2008 | Park | 370/349 |
| 2008/0313455 A1* | 12/2008 | Kroeselberg | 713/153 |
| 2009/0172398 A1* | 7/2009 | Falk et al. | 713/168 |
| 2010/0228980 A1* | 9/2010 | Falk et al. | 713/171 |

OTHER PUBLICATIONS

T. Clancy and H. Tschofenig. EAP Generalized Pre-Shared Key (EAP-GPSK) draft-ietf-emu-eap-gpsk-05. Apr. 5, 2007. IETF. p. 1-35.*
B. Aboba et al. RFC 3748: Extensible Authentication Protocol (EAP). Jun. 2004. IETF. p. 1-68.*
F. Bersani and H. Tschofenig. RFC 4764: The EAP-PSK Protocol: A Pre-Shared Key Extensible Authentication Protocol (EAP) Method. Jan. 2007. p. 1-65.*
Montenegro, G. et al., "Transmission of IPv6 Packets Over IEEE 802.15.4 Networks," The IETF Trust, RFC 4944, 29 pages, Sep. 2007.

* cited by examiner

*Primary Examiner* — Christian LaForgia
(74) *Attorney, Agent, or Firm* — Slater & Matsil, L.L.P.

(57) ABSTRACT

A system is provided that includes at least one processor and instructions that when executed by the processor promote exchanging extensible authentication protocol (EAP) messages for authentication by sending a plurality of data packets formatted in accordance with an IEEE 802.15.4 standard. The EAP messages are encapsulated within a data field of the IEEE 802.15.4 standard data packet and wherein the encapsulated EAP message comprises an EAP header and a data portion.

17 Claims, 6 Drawing Sheets

AUTHENTICATION OF 6LOWPAN NODES USING EAP-GPSK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless sensor networking is one of the most exciting and challenging research areas of recent time. The deployment of wireless sensor networks is becoming more common in a wide variety of applications for collecting and disseminating sensitive and important information. As the application of wireless sensor networks increases, security becomes an important concern since any vulnerability in the system may threaten the widespread practical use of wireless sensor networks. Authentication may be described as assuring that a communication device or sensor is what it represents itself to be rather than an impostor that may have malicious intentions.

SUMMARY

In a first aspect, the disclosure includes a system with at least one processor and instructions that when executed by the processor promote exchanging extensible authentication protocol (EAP) messages for authentication by sending a plurality of data packets formatted in accordance with an IEEE 802.15.4 standard. The EAP messages are encapsulated within a data field of the IEEE 802.15.4 standard data packet and wherein the encapsulated EAP message comprises an EAP header and a data portion.

In a second aspect, the disclosure includes a method of authenticating a wireless device. The method comprises configuring an authentication server and the wireless device with a pre-shared key (PSK) and sending a first extensible authentication protocol (EAP) request message encapsulated in an IEEE 802.15.4 packet, the first EAP request message comprising an EAP header and a data portion comprising an identity of the authentication server and a server random nonce. The method also comprises determining a plurality of keys based on the PSK, the identity of the authentication server, and the server random nonce and determining a first message integrity code (MIC) based on the identity of the authentication server, the server random nonce, and one of the plurality of keys determined based on the PSK. The method also comprises sending a first EAP response message encapsulated in an IEEE 802.15.4 packet, the first EAP response message comprising an EAP header and a data portion comprising a client random nonce, a selected cipher suite identity, and the first message integrity code (MIC), determining a second MIC based on the identity of the authentication server, the server random nonce, and one of the plurality of keys determined based on the PSK, and determining that the wireless device passes authentication based in part on comparing the second MIC with the first MIC contained in the first EAP response message.

In a third aspect, the disclosure includes a method of generating a message encryption key and a message authentication key. The method comprises sending a first extensible authentication protocol (EAP) keymessage encapsulated in an IEEE 802.15.4 packet, the first EAP key message comprising an EAP header and a data portion comprising an initiator random nonce and an initiator identity. The method also comprises deriving a plurality of keys based on the initiator random nonce. The method also comprises sending a second EAP key message and a third EAP key message. The second EAP key message is encapsulated in an IEEE 802.15.4 packet, and the second EAP key message comprises an EAP header and a data portion comprising a responder random nonce and a first message integrity code (MIC) based on the initiator random nonce, the responder random nonce, and the keys derived based on the initiator random nonce. The third EAP key message is encapsulated in an IEEE 802.15.4 packet, and the third EAP key message comprises an EAP header and a data portion containing a second MIC. The method also comprises deriving the encryption key and the message authentication key based on a temporal key (TK), wherein the temporal key is one of the plurality of keys derived based on the initiator random nonce.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The IEEE 802.15.4 standard defines wireless personal area networks (WPANs) for small, inexpensive, power-efficient, short-range wireless devices. The main objectives of a low rate WPAN are ease of installation with little infrastructure, reliable data transfer, short-range operation, and extremely low cost and reasonable battery life, while maintaining a simple and flexible protocol. The IEEE 802.15.4 standard identifies a number of security suites for data confidentiality, data authenticity, and replay protection, but does not define the processes of key exchange and authentication, which is left to be addressed by the higher layers of the WPAN communications architecture.

The ZigBee specification defines a security architecture for the IEEE 802.15.4 networks, which splits the security functionalities into three layers: a medium access control (MAC) layer, a network (NWK) layer, and an application (APS) layer. The MAC layer is defined by IEEE 802.15.4. The main responsibilities of the NWK layer include the mechanisms used to join and leave a network, apply security to frames and to route frames to their intended destinations. The APS layer is responsible for the establishment and maintenance of security relationships. The ZigBee security architecture uses a trust center for device authentication and key management. Each device receives the initial master key or network key from the trust center via unsecured key transport. Subsequent master key, network key, and link keys are obtained from the trust center via secured key transport. Since the master key is used as the long-term security between two devices and is not protected cryptographically, it results in a security flaw.

Herein a new authentication method is disclosed that authenticates the IEEE 802.15.4 based sensor devices using a lightweight EAP authentication method EAP-GPSK. According to this method, the sensors of the WPAN have a pre-shared key also known to an authentication server used in association with a novel EAP encapsulation messaging system and method. The EAP packets are encapsulated in IEEE 802.15.4 frames. A 3-party architecture is disclosed that includes a PAN coordinator as the authenticator, the sensor device as the peer, and the AAA server as the authentication server. A novel security application protocol (SAP) messaging method to share and authenticate security keys between the sensor device or peer and the PAN coordinator is also described.

Figure 1:
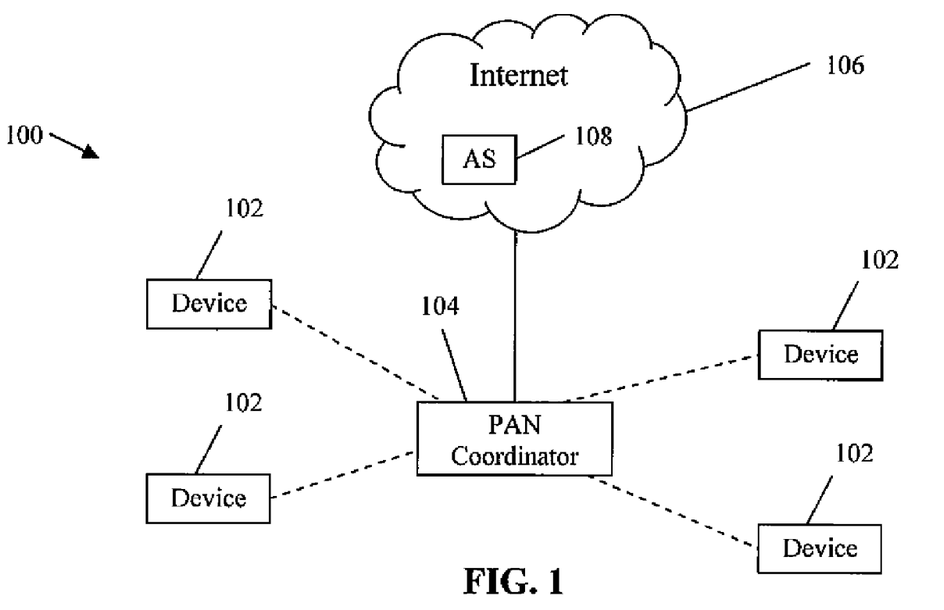
FIG. 1 is an illustration of a wireless communication system according to an embodiment.

FIG. 1 illustrates an embodiment of a wireless communication system 100. The wireless communications system 100 may include a plurality of devices 102 in wireless communication with a PAN coordinator 104. The PAN coordinator 104 may communicate with an authentication server (AS) 108 using a wired or a wireless connection. The AS 108 may be located in a different network, such as the Internet 106. As shown in FIG. 1, the devices 102 and the PAN coordinator 104 may be configured in a single-hop WPAN topology such that each device 102 communicates directly with the PAN coordinator 104. Such an embodiment may be configured as described in IEEE standard 802.15.4, entitled "Wireless Medium Access Control (AC) and Physical Layer (PHY) Specifications for Low-Rate Wireless Personal Area Networks (WPANs)", which is incorporated herein by reference as if reproduced in its entirety. Such an embodiment may also transport internet protocol version 6 (IPv6) packets between each device 102 and the PAN coordinator 104 as described in IETF RFC 4944 by Montenegro et al. and entitled "Transmission of IPv6 Packets over IEEE 802.15.4 Networks", which is incorporated herein by reference as if reproduced in its entirety. In an embodiment, the system 100 employs Internet protocol version 6 (IPv6) addressing and the devices 102 and the PAN coordinator 104 may be referred to as a 6LoW-PAN network, indicating that these devices use IPv6 over Low power Wireless Personal Area Network.

The devices 102 may be any devices that access or communicate, directly or indirectly, with the PAN coordinator 104. For example, the device 102 may be a wireless sensor that measures a property and communicates the property to the PAN coordinator 104. The devices 102 may be IPv6-enabled and may implement an IP stack. Specifically, when the devices 102 need to send IPv6 packets to the Internet 106, they may encapsulate the packets in IEEE 802.15.4 frames and send the frames to the PAN coordinator 104. Examples of properties measured by the devices 102 include temperature, pressure, motion, position, concentration, and so forth. Typically, the devices 102 are small autonomous devices whose processing ability is limited to the measurement and communications functions described herein. In an embodiment, some of the devices 102 sense consumption of public utility resources, for example electricity consumption, natural gas consumption, water consumption, and others. However, the devices 102 may also include portable computers, such as laptop, notebook, and tablet computers, cellular telephones, personal digital assistants (PDAs), and other mobile communication or computing systems. Alternatively, the device 102 may be any other type of computer or communication device known to persons of ordinary skill in the art. Each of the devices 102 is configured with a unique pre-shared key (PSK) to promote authentication functions that will be discussed further hereinafter.

The PAN coordinator 104 may be a router, bridge, switch, or any other device that routes data packets between the devices 102 and the Internet 106. Specifically, the PAN coordinator 104 may be the default router for the devices 102 and may act as an authenticator for the devices 102. The PAN coordinator 104 may receive IPv6 packets from the Internet 106, encapsulates the packets in IEEE 802.15.4 frames, and sends the packets to the appropriate device 102. Under some conditions, the PAN coordinator 104 may fragment or segment IPv6 packets before encapsulating them in IEEE 802.15.4 frames, whereby to conform with packet size constraints that could be associated either with the devices 102 or the IEEE 802.15.4 standard. Similarly, the PAN coordinator 104 may receive IEEE 802.15.4 packets from the devices 102, reassemble the frames into IPv6 packets, and send the IPv6 packets to the Internet 106. In an embodiment, the PAN coordinator 104 may collect public utility consumption data from the devices 102, for example electrical power consumed, water volume consumed, natural gas volume consumed, and other, and provide this data to one or more public utility providers, for example an electric power company, a natural gas company, a municipal water organization.

The AS 108 is a server that may implement one or more authentication, authorization, or accounting (AAA) functions. In an embodiment, the AS 108 may support one or more protocols such as RADIUS and/or DIAMETER. The AS 108 is configured with the pre-shared keys (PSK) of the devices 102. Authentication may refer to the verification of the identity of a user, network, or device. The AS 108 may be implemented as a general purpose computer system.

Figure 2:
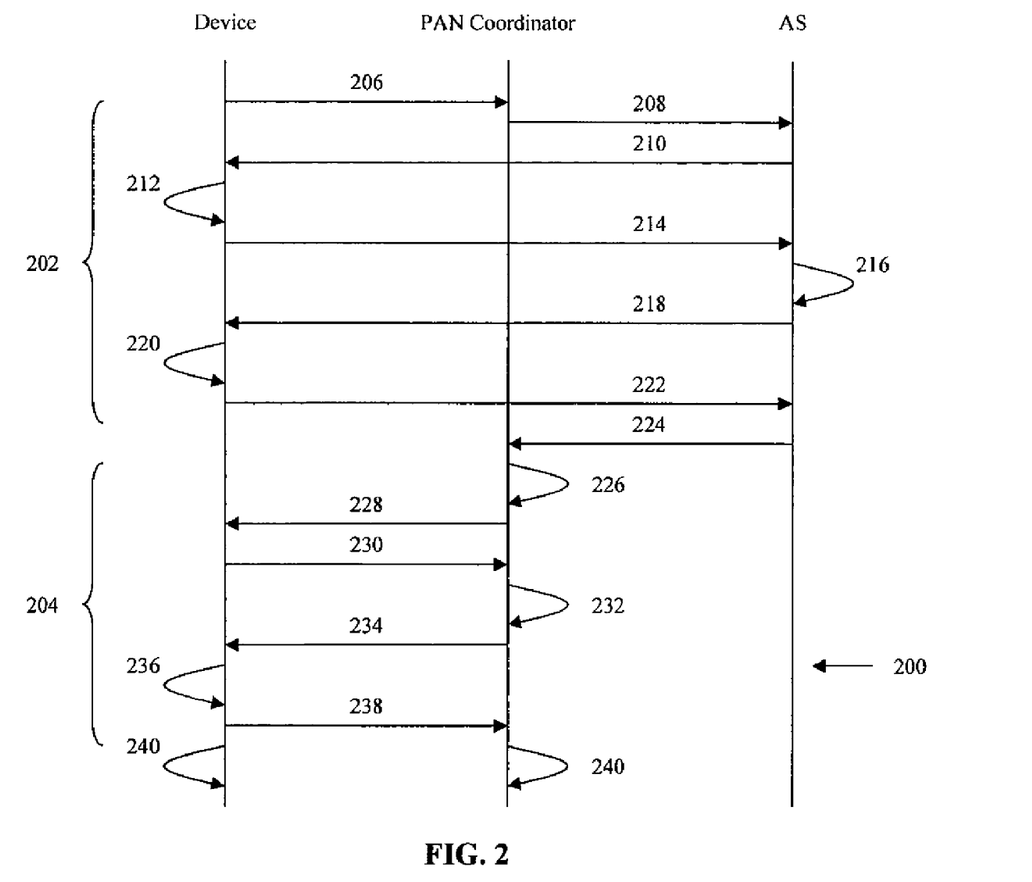
FIG. 2 is an illustration of an authentication messaging sequence according to an embodiment.

Turning now to FIG. 2, an authentication message sequence diagram is discussed. While the authentication of one device 102 is described, it is understood that the authentication of other devices 102 that are members of the network 100 may be completed by a substantially similar process. The sequence of messages may be parsed into an authentication message exchange 202 and a key creation message exchange 204. The device 102 sends an extensible authentication protocol (EAP) start message 206 to the PAN coordinator 104. In some contexts the device 102 may be referred to as a supplicant and the PAN coordinator 104 may be referred to as an authenticator. The PAN coordinator 104 responds to the EAP start message 206 by sending an access request message 208 to the AS 108. As described above, the PAN coordinator 104 may restructure the IEEE 802.15.4 message frame or message packet received from the device 102 before sending the message forward to the AS 108. Such mediation functions or reformatting functions are well understood by those skilled in the art and will not be further described hereinafter.

The AS 108 sends an EAP general pre-shared key (GPSK) message—a EAP GPSK-1 request message 210—to the device 102 by way of the PAN coordinator 104. The EAP GPSK-1 request message 210 includes the identity of the AS 108, a random nonce, and an optional list of supported cipher suites. A nonce is a random number generated for one time use in a security operation, and the terms nonce and random nonce may be used interchangeably hereinafter. At least some of this data is used to determine authentication and encryption keys at the device 102, as discussed in detail hereinafter.

In an embodiment, the system 100 is designed with the understanding that a default cipher suite is to be used, and in this case no list of supported cipher suites need be sent in the EAP GPSK-1 request message 210, thereby reducing the size of the EAP GPSK-1 request message 210; alternatively, a list of supported cipher suites containing only the identification of the default cipher suite may be sent in the EAP GPSK-1 request message 210. In an embodiment, the default cipher suite may be the ENC-MIC-64 cipher suite. The identity of the AS 108 is provided as a 16-octet IPv6 address and the random nonce, which also may be referred to as the server nonce, is provided as a 16-octet number in the EAP GPSK-1 request message 210. The reliance on a default cipher suite may reduce the size of the list of supported cipher suites significantly and reduce the communications overhead of the authentication message exchange 202. Likewise, the use of the 16-octet random nonce instead of a 32-octet random nonce and the use of the IPv6 address for the identity of the AS 108 instead of a network access identifier (NAI) of the AS 108, which could be as long as 253-octets, may reduce the communications overhead of the authentication message exchange 202.

At label 212, the device 102 determines a random nonce of the device 102 and derives a 16-octet master key (MK) from the pre-shared key (PSK), the identity of the AS 108, the random nonce of the AS 108, the identify of the device 102, and the random nonce of the device 102 using the generalized key derivation function (GKDF) of the selected cipher suite as follows:

MK=GKDF16(0x00, PL|PSK|CSuite|RndCInt|IdCInt|RndSrv|IdSrv)

The GKDF is discussed in detail in the EAP Generalized Pre-Shared Key (EAP-GPSK) Internet Engineering Task Force (IETF) I-D, draft standard, dated July 2007, which is herein incorporated by reference as if reproduced in its entirety. In general, the function GKDFx(arg1, arg2) uses the GKDF to produce a x-octet long key string based on arg1 and arg2. The notation "X|Y| . . . |Z" indicates that the several elements X, Y, and Z are concatenated to form an argument. These notations and general procedures are familiar to those skilled in the art of communication device authentication and authorization. The concatenated argument includes PL which represents the length of PSK (16 octets by default), PSK which is the pre-shared key known to both the device 102 and the AS 108, CSuite which is the selected cipher suite (ENC-MIC-64 by default), RndCInt which is the random nonce of the device 102, IdcInt which is the identity of the device 102, RndSrv which is the random nonce of the AS 108, and the IdSrv which is the identity of the AS 108.

The device 102 then derives a master session key (MSK), an extended master session key (EMSK), a session key (SK), and a protected data encryption key (PK) from the MK using a key derivation function (KDF) as follows:

KeyString=KDF160MK, RndCInt|IdCInt|RndSrv|IdSrv)

The KDF is discussed in detail in the EAP Generalized Pre-shared Key (EAP-GPSK) Internet Engineering Task Force (ETE) I-D, draft standard, dated July 2007.

The KDF generates a 160-octet KeyString, where the MSK is the left most 64 octets (i.e. KeyString[0 . . . 63]), the EMSK is the next 64 octets (i.e. KeyString[64 . . . 127]), the SK is the next 16 octets (i.e. KeyString[128 . . . 143]), and the PK is the last 16 octets (i.e. KeyString[144 . . . 159]).

After deriving MSK, EMSK, SK, and PK, the device 102 sends an EAP GPSK-2 response message 214 to the AS 108 by way of the PAN coordinator 104. The EAP GPSK-2 response message 214 identifies the selected cipher suite, the identity of the device 102, and a random nonce of the device 102. The EAP GPSK-2 response message 214 also includes an optional protected data (PD) payload and a message integrity code (MIC). The MIC is computed according to the selected cipher suite based on the identity of the device 102, the random nonce of the device 102, the identity of the AS 108, the random nonce of the AS 108, the PD payload, if present, and the SK. The identity of the device 102 is set to an IEEE 64-bit extended MAC address of the device 102. The random nonce of the device 102, which may also be referred to as a client nonce, is a 16-octet number. In an embodiment, the EAP GPSK-2 response message 214 omits the server identity, the server nonce, and the selected cipher suite, thereby reducing the communications overhead of the authentication message exchange 202.

At label 216, the AS 108 derives the MSK, EMSK, SK, and PK as described above and verifies the MIC contained in the EAP GPSK-2 response message by calculating the MIC and comparing the calculated MIC to the transported MIC. If the EAP GPSK-2 response message passes this MIC verification, authentication of the device 102 is deemed successful, and the AS 108 sends an EAP (GPSK-3 request message 218 to the device 102 by way of the PAN coordinator 104. The EAP GPSK-3 request message includes a random nonce of the AS 108, the random nonce of the device 102, an optional PD payload, and a new MIC that is computed according to the selected cipher suite based on the identity of the device 102, the random nonce of the device 102, the optional PD payload, and the SK.

At label 220, the device 102 verifies the new MIC and sends an EAP GPSK-4 response message 222 to the AS 108 by way of the PAN coordinator 104. The EAP GPSK-4 response message 222 contains an optional PD payload and a MIC computed over the message. When the AS 108 receives the EAP GPSK-4 response message, the authentication of the device 102 is completed. The four EAP GPSK messages may be referred to as a four-way EAP GPSK handshake. In an embodiment, the EAP GPSK-1 request message 210, the EAP GPSK-2 response message 214, the EAP GPSK-3 request message 218, and the EAP GPSK-4 response message 222 are encapsulated in IEEE 802.15.4 frames or packets according to a novel data field structure that is discussed in detail hereinafter.

The AS 108 sends an access-accept message 224 that contains the MSK to the PAN coordinator 104. At label 226, the PAN coordinator 104 stores the MSK. The PAN coordinator 104 sends an EAP success message 228 to the device 102, indicating that the PAN coordinator 104 possesses the MSK.

The device 102 sends a first EAP key message—indicated as a SAP-1 message 230—to the PAN coordinator 104. In the context of secure authentication protocol (SAP) messages, the device 102 may be referred to as the supplicant and the PAN coordinator 104 may be referred to as the authenticator. The SAP-1 message 230 contains the identity of the device 102 and a random nonce of the device 102. At label 232, the PAN coordinator 104 derives a key encryption key (KEK) and a temporal key (TK) using the general key derivation function (GKDF) with the MSK as follows:

Key=GKDF16(0x00, ML|MSK|DefCS|RndSp|IdSp|RndAu|IdAu)

KeyString=GKDF96(Key, RndSp|IdSp|RndAu|IdAu)

ML is the length of MSK (64-octets), DefCS is the default cipher suite (ENC-MIC-64), RndSp is the random nonce of the device 102, IdSp is the identity of the device 102, RndAu is the random nonce of the PAN coordinator 104, and IdAu is the identity of the PAN coordinator 104. The GKDF96 generates a 96-octet KeyString, where the first 32 octets of KeyString (i.e. KeyString[0 ... 31]) is not used, where KEK is the next 16 octets, (i.e. KeyString[32 ... 47]), and where TK is the right most 16 octets of the KeyString (i.e. KeyString[80 ... 95]).

The PAN coordinator 104 sends a second EAP key message—indicated as a SAP-2 message 234—to the device 104. The SAP-2 message 234 contains the identity of the PAN coordinator 104, the random nonce of the PAN coordinator 104, and the MIC computed over the identity of the PAN coordinator 104, the random nonce of the PAN coordinator 104, the identity of the device 102, and the KEK.

At label 236, the device 102 determines the KEK and the TK by the same process described above and verifies the MIC contained in the SAP-2 message 234. If the MIC verification succeeds, the key exchange is successful, and the device 102 sends a third EAP key message—indicated as a SAP-3 message 238—to the PAN coordinator 104 containing the random nonce of the device 102, the random nonce of the PAN coordinator 104, and a MIC determined using the KEK.

At label 240, both the device 102 and the PAN coordinator 104 independently determine an encryption key Kenc and an authentication key Kmac from TK as follows:

KeyString=KDF32(TK, RndSp|IdSp|RndAu|IdAu)

Where the KeyString is a 32-octet value, Kenc is the left 16 octets of the KeyString (i.e. KeyString[0 ... 15]), and Kmac is the right 16 octets of the KeyString (i.e. KeyString[16 ... 31]).

Figure 3:
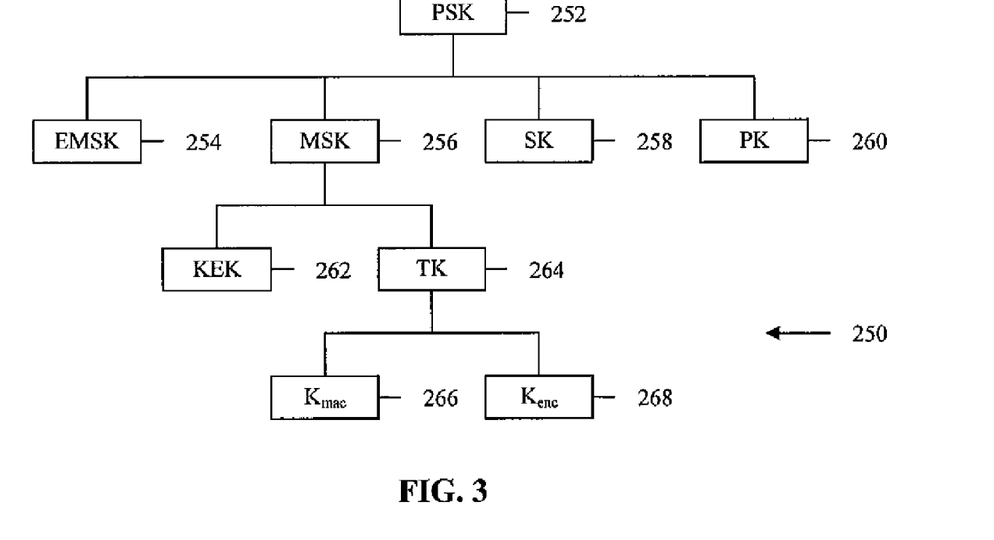
FIG. 3 is an illustration of an authentication and encryption key hierarchy according to an embodiment.

Turning now to FIG. 3, the architectural relationships among several of the keys described above is illustrated. These relationships may be referred to collectively as a key tree 250. The root or source of the key tree 250 may be conceived as the pre-shared key (PSK) 252 which is configured into the device 102 and the AS 108. The EMSK 254, the MSK 256, the SK 258, and the PK 260 are derived from the PSK 252 and other parameters as described above. The KEK 262 and the TK 264 are derived from the MSK 256 as described above. The Kmac 266 and the Kenc 268 are derived from the TK 264 as described above.

Turning now to FIG. 4A, FIG. 4B, FIG. 4C, and FIG. 4D, a message structure for communicating EAP GPSK messages between the device 102 and the PAN coordinator 104 are described. The 802.15.4 packet 330 comprises a frame control field 332, a sequence number field 334, an addressing field 336, an auxiliary security header field 338, a mesh header field 340, the 802.1X header field 342, the EAP header field 344, the data field 346, and the frame checksum (FCS) 348. Typical sizes of each of these fields are indicated in numbers of octets. The data field 346 does not indicate a typical size, because the size of the data field 346 may vary considerably from message to message.

Figure 4A:
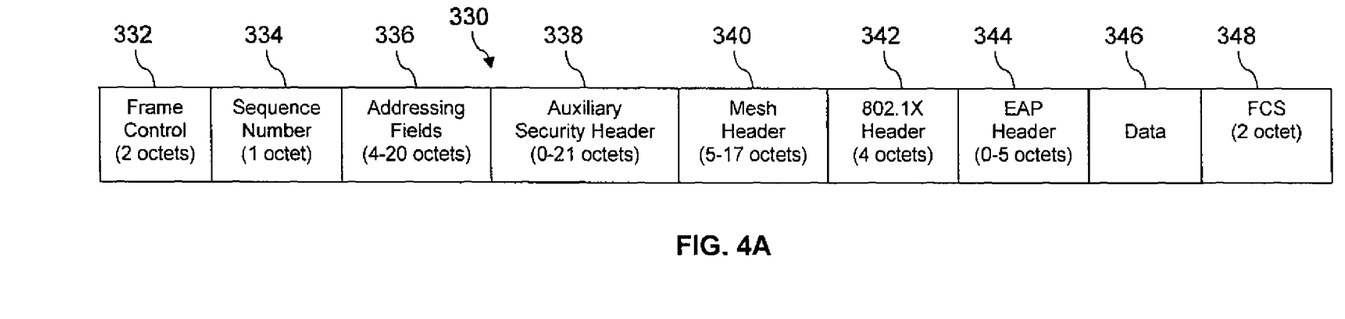
FIGS. 4A, 4B, 4C, and 4D are illustrations of a message packet for embedding extensible authentication protocol general pre-shared key messages (EAP GPSK) according to an embodiment.
Figure 4B:
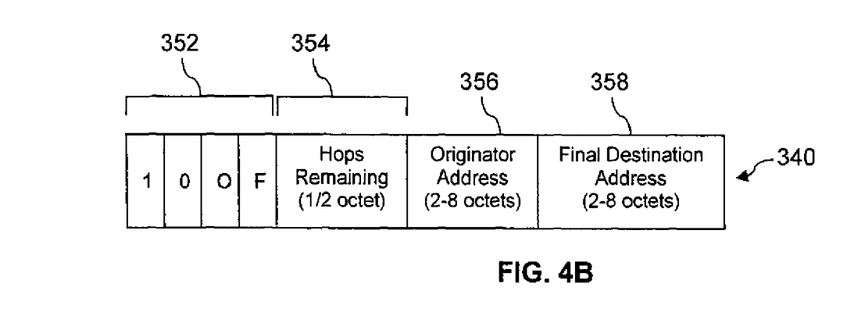

The structure of the mesh header 340 is illustrated in FIG. 4B. The mesh header 340 comprises a plurality of fields including a four bit field 352 where the first bit is set to a 1 value and the second bit is set to a 0 value. The third bit, labeled "O", is set to a 0 value if the originator address is a 64-bit address and is set to a 1 value if the originator address is a 16-bit address. The fourth bit, labeled "F", is set to a 0 value if the final destination address is a 64-bit address and is set to a 1 value if the final destination address is a 16-bit address. A hops remaining field 354 is decremented by each forwarding node before sending the packet 330 towards its next hop. The packet 330 is not forwarded any further if the value of the hops remaining field 354 is zero. An originator address field 356 is the link-layer address of the originator of the packet 330. The final destination address 358 is the link layer address the destination of the packet 330.

Figure 4C:
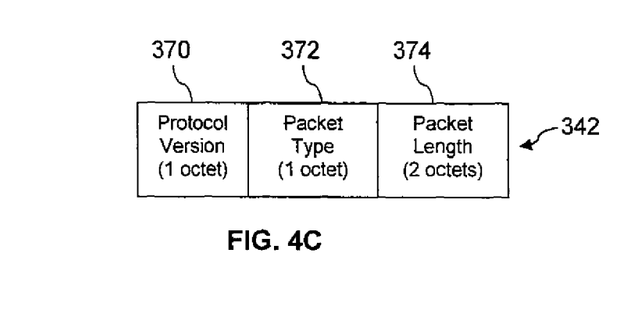

The structure of the 802.1X header 342 is illustrated in FIG. 4C. The 802.1x header 342 comprises a plurality of fields described as follows. A protocol version field 370 indicates that the EAP over low rate WPAN protocol version is 1. A packet type field 372 indicates the type of the packet 330, and a value of 0 in this field indicates an EAP type packet 330. A packet length field 374 indicates the length of the packet 330 excluding the frame control field 332, the sequence number field 334, the addressing field 336, the auxiliary security header field 338, the mesh header field 340, and the 802.1x header field 342.

Figure 4D:
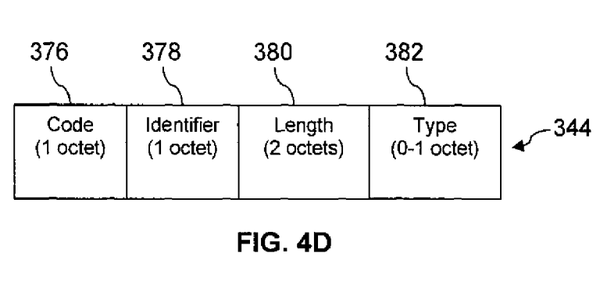

The structure of the EAP header field 344 is illustrated in FIG. 4D. The EAP header field 344 comprises a plurality of fields described as follows. A code field 376 indicates the type of each packet 330 that is an EAP type packet. There are four types of EAP packets: a GPSK-1 type, a GPSK-2 type, a GPSK-3 type, and a GPSK-4 type, corresponding to the four EAP GPSK messages exchanged during the four-way EAP GPSK handshake procedure described above with reference to FIG. 2. An identifier field matches EAP responses with EAP requests. When an EAP response is sent, for example from the device 102 to the AS 108 in response to an EAP request received by the device 102, the value of the identifier field 378 is the same as the value in the corresponding EAP request. A length field 380 indicates the length of the EAP packet, which includes the EAP header 344 and the data 346. Thus, the EAP packet may be considered to be encapsulated within the packet 330. An optional type field 382 is present for EAP request and EAP response packets that is used to identify the EAP method used, for example the EAP GPSK method.

Figure 5:
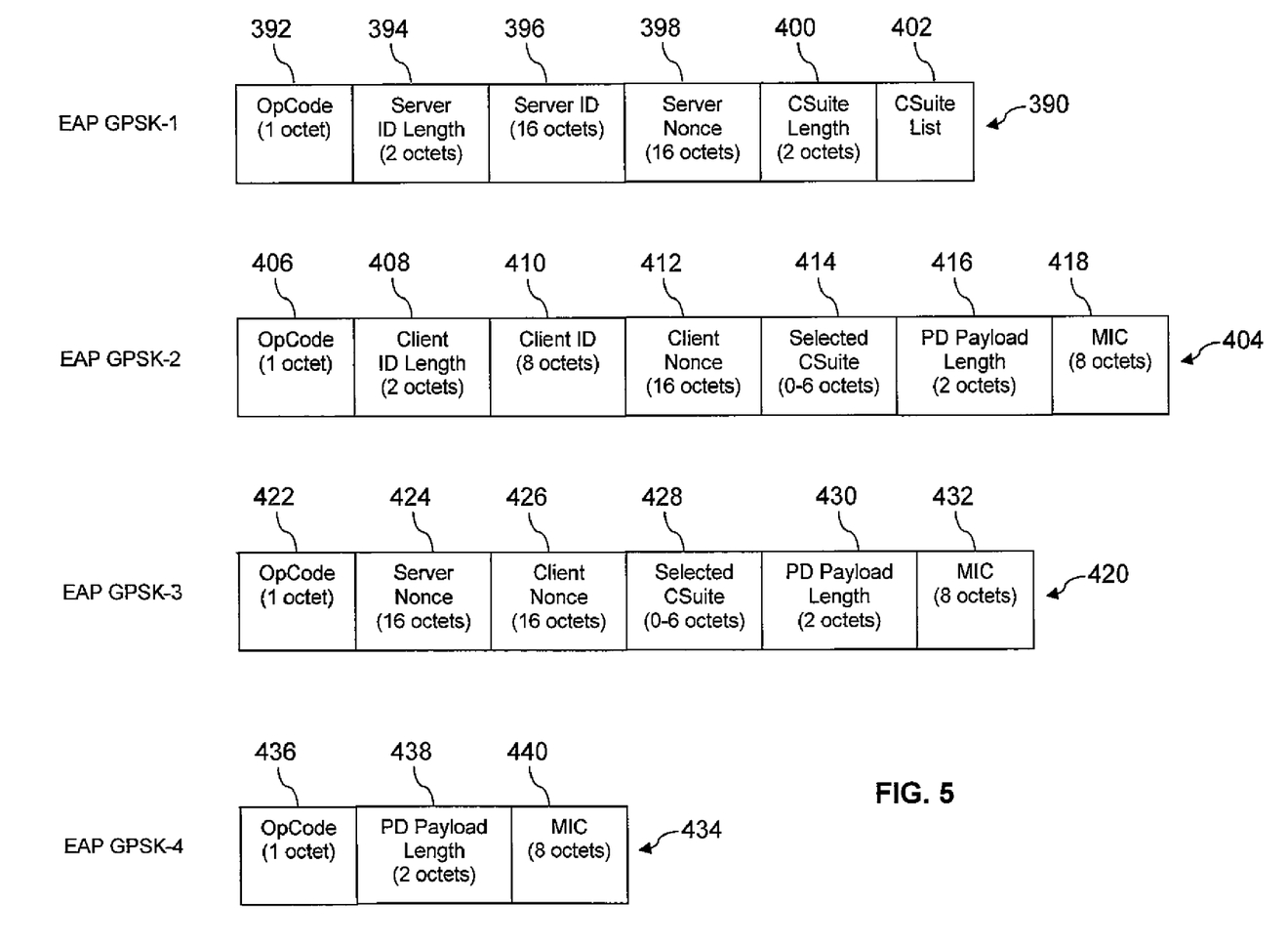
FIG. 5 is an illustration of four embedded EAP GPSK messages according to an embodiment.

Turning now to FIG. 5, the structure of the data 346 is shown for the EAP GPSK four-way handshake message exchange described above with reference to FIG. 2. In the context of the EAP GPSK four-way handshake message exchange, the role of the AS 108 may be characterized as a server and the role of the device 102 may be characterized as a client. The EAP GPSK-1 request message 210 has an EAP GPSK-1 data field 390 structured into a plurality of fields described as follows. An OpCode field 392 indicates the kind of EAP GPSK operation associated with the EAP packet. A server identity length field 394 identifies the length of the identity of the AS 108. A server identity field 396 contains the identity of the AS 108, which is a 16 octet IPv6 address. The server nonce field 398 contains the random nonce generated by the AS 108. The sever nonce field 398 is a 16-octet field as opposed to the previously known 32-octet field, thereby saving communications overhead. The cipher suite length field 400 identifies the length of the cipher suite list. A cipher suite list field 402 defines the cipher suites supported by the AS 108. To reduce the communications overhead, the cipher suite list is minimized to one member of the IEEE 802.15.4 standard cipher suite, for example ENC-MIC-64.

The EAP GPSK-2 response message 214 has an EAP GPSK-2 data field 404 structured into a plurality of fields described following. An OpCode field 406 indicates the kind of EAP GPSK operation associated with the EAP packet. A client identity length field 408 identifies the length of the identity of the device 102, which is a 8-octet IEEE 64-bit extended MAC address. A client identity field 410 contains the identity of the device 102. A client nonce field 412 contains the random nonce generated by the device 102. The client nonce field 412 is a 16-octet field as opposed to the previously known 32-octet field, thereby saving communications overhead. Communications overhead is also saved by not repeating the server nonce and server identity in the EAP GPSK-2 response message 214. A selected cipher suite field 414 identifies the cipher suite selected by the device 102. Because the selected cipher suite is known in advance to be the defined member of the IEEE 802.15.4 standard cipher suite, for example ENC-MIC-64, the selected cipher suite filed 414 need not be sent and this field contains zero octets, thereby saving communications overhead. The inclusion of the selected cipher suite field 414 in this description and in FIG. 5 is to promote the appreciation of this innovation. An optional protected data payload length field 416 indicates the length of protected data sent. A MIC field 418 contains a MIC calculated as described above with reference to the EAP GPSK-2 response message 214

The EAP GPSK-3 request message 218 has an EAP GPSK-3 data field 420 structured into a plurality of fields. An OpCode field 422 indicates the kind of EAP GPSK operation associated with the EAP packet. A server nonce field 424 contains a random nonce determined by the AS 108. A client nonce field 426 contains the value of the client nonce sent in the EAP GPSK-2 response message 214. A selected cipher suite field 428 echoes the value contained in the selected cipher suite field 414 of the EAP GPSK-2 response message 214. An optional protected data payload length field 430 indicates the length of optional protected data sent. A MIC field 432 contains a MIC calculated as described above with reference to the EAP GPSK-3 request message 218.

The EAP GPSK-4 response message 222 has an EAP GPSK-4 data field 434 structured into a plurality of fields. An OpCode field 436 indicates the kind of EAP GPSK operation associated with the EAP packet. An optional protected data payload length field 438 indicates the length of optional protected data sent. A MIC field 440 contains a MIC calculated as described above with reference to the EAP GPSK-4 request message 222.

Figure 6:
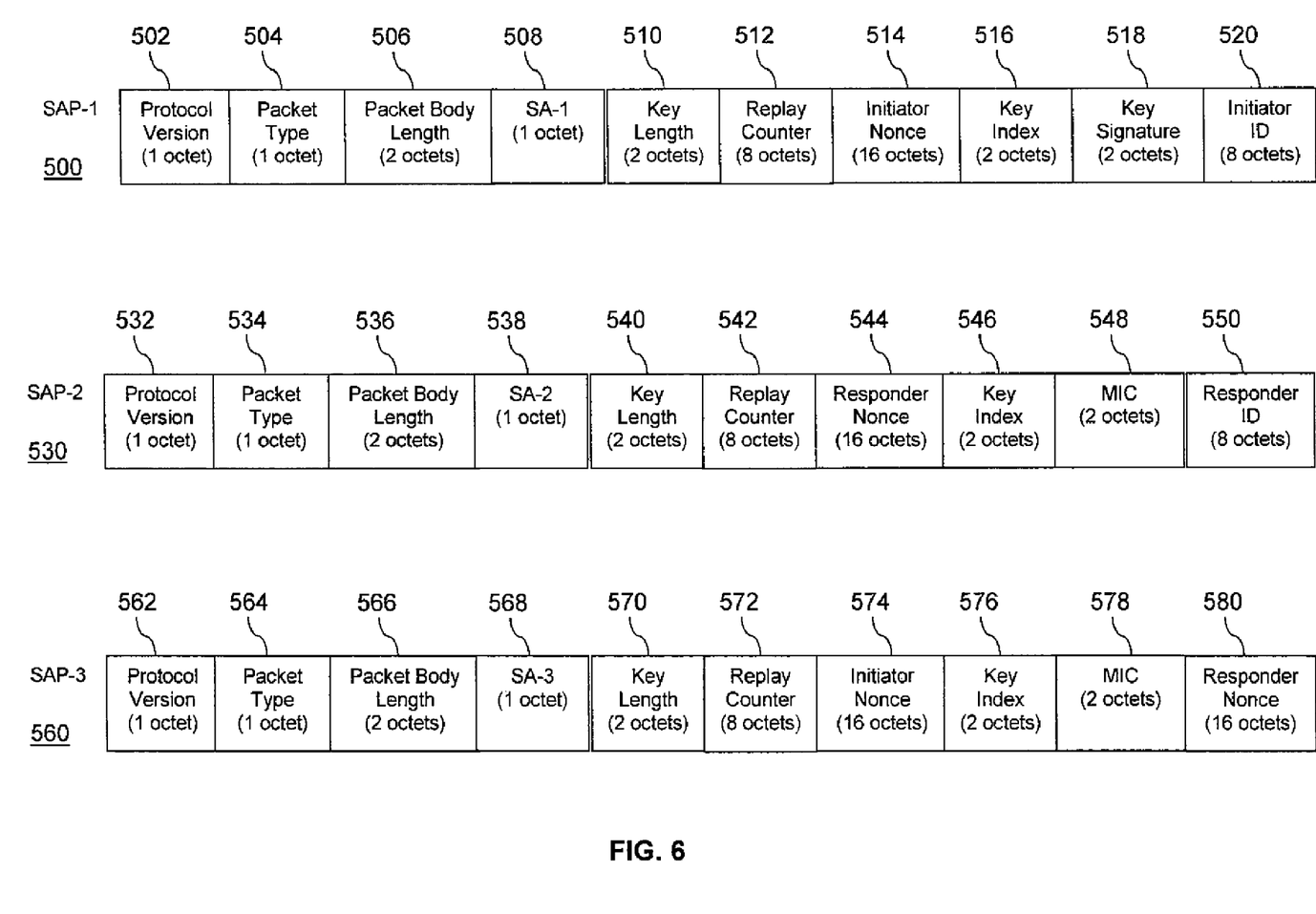
FIG. 6 is an illustration of three embedded secure association protocol (SAP) messages according to an embodiment.

Turning now to FIG. 6, the structure of the EAP key messages are described. In the context of the EAP key message exchanges between the device 102 and the PAN coordinator 104, the device 102 may be referred to as the initiator and the PAN coordinator may be referred to as the responder. The EAP key messages comprises the frame control field 332, the sequence number field 334, the addressing field 336 the auxiliary security header field 338, the mesh header field 338, and the 802.1x header field 342, which are shown in FIG. 4A, FIG. 4B, and FIG. 4C. The 802.1X header field 342 is shown in the representation of EAP key messages to provide orientation to the EAP key message structure. The SAP-1 message 500 further contains additional fields described as follows. A descriptor type field 508 indicates a SAP-1 type message. A key length field 510 indicates the length of the identity of the device 102. A replay counter field 512 is not used. An initiator nonce field 514 provides the random nonce of the device 102. A key index field 516 is not used. A key signature field 518 is not used. An initiator identity field 520 contains the identity of the device 102.

The SAP-2 message 530 further contains additional fields. A descriptor type field 538 indicates a SAP-2 type message. A key length field 540 indicates the length of the identity of the PAN coordinator 104. A replay counter field 542 is not used. A responder nonce field 544 provides the random nonce of the PAN coordinator 104. A key index field 546 is not used. A MIC field 548 contains a MIC calculated as described above. A responder identity field 520 contains the identity of the PAN coordinator 104.

The SAP-3 message 560 further contains additional fields. A descriptor type field 568 indicates a SAP-3 type message. A key length field 570 indicates the length of random nonce of the PAN coordinator 104. A replay counter field 572 is not used. An initiator nonce field 574 provides the random nonce of the device 102. A key index field 576 is not used. A key signature field 578 is not used. A responder nonce field 580 contains the random nonce of the PAN coordinator 104. The creation and use of these EAP SAP message fields is described above with reference to FIG. 2.

Figure 7:
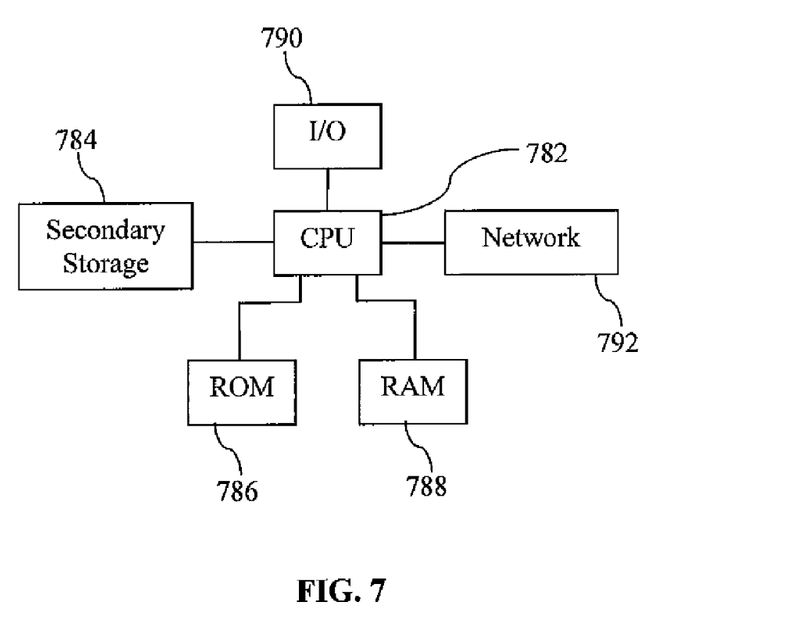
FIG. 7 is an illustration of a general purpose computer system according to an embodiment.

The network described above may be implemented on any general-purpose network component, such as a computer or network component with sufficient processing power, memory resources, and network throughput capability to handle the necessary workload placed upon it. FIG. 7 illustrates a typical, general-purpose network component 780 suitable for implementing one or more embodiments of a node disclosed herein. The network component 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips, or may be part of one or more application specific integrated circuits (ASICs).

The secondary storage 784 is typically comprised of one or more disk drives or tape drives and is used for non-volatile storage of data and as an over-flow data storage device if RAM 788 is not large enough to hold all working data. Secondary storage 784 may be used to store programs that are loaded into RAM 788 when such programs are selected for execution. The ROM 786 is used to store instructions and perhaps data that are read during program execution. ROM 786 is a non-volatile memory device that typically has a small memory capacity relative to the larger memory capacity of secondary storage. The RAM 788 is used to store volatile data and perhaps to store instructions. Access to both ROM 786 and RAM 788 is typically faster than to secondary storage 784.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of authenticating a wireless device, comprising:
configuring an authentication server and the wireless device with a pre-shared key (PSK);
sending by the authentication server a first extensible authentication protocol (EAP) request message encapsulated in a wireless personal area network standard packet, the first EAP request message comprising an EAP header and a data portion comprising an identity of the authentication server and a server random nonce;
determining by the wireless device a plurality of keys based on the PSK, the identity of the authentication server, and the server random nonce;
determining by the wireless device a first message integrity code (MIC) based on the identity of the authentication server, the server random nonce, and one of the plurality of keys determined based on the PSK;
sending by the wireless device a first EAP response message encapsulated in the wireless personal area network standard packet, the first EAP response message comprising an EAP header and a data portion comprising a client random nonce, a selected cipher suite identity, and the first message integrity code (MIC);
determining by the authentication server a second MIC based on the identity of the authentication server, the server random nonce, and one of the plurality of keys determined based on the PSK; and
determining by the authentication server that the wireless device passes authentication based in part on comparing the second MIC with the first MIC contained in the first EAP response message.

2. The method of claim 1, further including:
determining by the authentication server a third MIC based on the selected cipher suite identity and one of the plurality of keys determined based on the PSK;
sending by the authentication server a second EAP request message encapsulated in the wireless personal area network standard packet, the second EAP request message comprising an EAP header and a data portion comprising the third MIC;
sending determining by the wireless device a second EAP response message encapsulated in the wireless personal area network standard packet; and sending an access-accept message to a personal area network (PAN) coordinator that performs communication gateway functions for the wireless device.

3. The method of claim 2, wherein the data portion of the second EAP request message includes an opcode field identifying a GPSK message type, and a server random nonce field, and a client random nonce field.

4. The method of claim 1, wherein the data portion of the first EAP request message includes an opcode field identifying a GPSK message type, a server identity field, a server random nonce field, and a cipher suite list field.

5. The method of claim 1, wherein the data portion of the first EAP response message includes an opcode field identifying a GPSK message type, a client identity field, a client random nonce field, and a selected cipher suite field.

6. The method of claim 1, wherein the EAP header includes a code field that indicates the type of EAP message, an identifier field identifies an EAP requestor device, and a length field defines the length of the encapsulated EAP message.

7. A method of generating a message encryption key and a message authentication key, comprising:
sending by a wireless device a first extensible authentication protocol (EAP) key message encapsulated in a wireless personal area network standard packet, the first EAP key message comprising an EAP header and a data portion comprising an initiator random nonce and an initiator identity;
deriving by a personal area network (PAN) coordinator a plurality of keys based on the initiator random nonce;
sending by the PAN coordinator a second EAP key message encapsulated in the wireless personal area network standard packet, the second EAP key message comprising an EAP header and a data portion comprising a responder random nonce and a first message integrity code (MIC) based on the initiator random nonce, the responder random nonce, and the keys derived based on the initiator random nonce;
sending by the wireless device a third EAP key message encapsulated in the wireless personal area network standard packet, the third EAP key message comprising an EAP header and a data portion containing a second MIC; and
deriving independently by the wireless device and by the PAN coordinator the encryption key and the message authentication key based on a temporal key (TK), wherein the temporal key is one of the plurality of keys derived based on the initiator random nonce.

8. The method of claim 7, wherein the first, second, and third EAP key messages include a descriptor type field that identifies each message as one of an EAP SAP-1 type message, an EAP SAP-2 type message, and an EAP SAP-3 type message.

9. The method of claim 7, wherein the EAP header comprises a code field that indicates the type of EAP message, an identifier field identifies an EAP requestor device, and a length field defines the length of the encapsulated EAP message.

10. The method of claim 7, further including receiving an access-accept message from an authentication server containing a master session key (MSK), wherein deriving the plurality of keys is further based on the MSK.

11. The method of claim 7, wherein deriving the plurality of keys comprises determining a 96-octet key string based on the MSK, the initiator random nonce, the responder random nonce, wherein the plurality of keys are contained in the 96-octet key string.

12. The method of claim 11 wherein the TK is a 16-octet substring of the 96-octet key string defined as 96-octet key string[80..95].

13. The method of claim 7 wherein a 32-octet key string is determined based on the TK, the initiator random nonce, the initiator identity, the responder random nonce, and the responder identity, wherein the encryption key is defined as a 16-octet substring of the 32-octet key string[0..15], and wherein the message authentication key is defined as a 16-octet substring of the 32-octet key string[16..31].

14. A method of authenticating a wireless device, comprising:
configuring the wireless device with a pre-shared key (PSK) which is shared with an authentication server;
sending by the authentication server a first extensible authentication protocol (EAP) request message encapsulated in a wireless personal area network standard packet, the first EAP request message comprising an EAP header and a data portion comprising an identity of the authentication server and a server random nonce;

receiving by the authentication server a first EAP response message encapsulated in the wireless personal area network standard packet, the first EAP response message comprising an EAP header and a data portion comprising a client random nonce, a selected cipher suite identity, and a first message integrity code (MIC), wherein the first MIC is determined by the wireless device based on the identity of the authentication server, the server random nonce, and one of the plurality of keys determining by the wireless device based on the PSK;

determining by the authentication server a second MIC based on the identity of the authentication server, the server random nonce, and one of the plurality of keys determined based on the PSK; and determining by the authentication server that the wireless device passes authentication based in part on comparing the second MIC with the first MIC contained in the first EAP response message received by the authentication server.

15. A method of authenticating a wireless device, comprising:

configuring an authentication server with a pre-shared key (PSK) which is shared with the wireless device;

receiving by the wireless device a first extensible authentication protocol (EAP) request message encapsulated in a wireless personal area network standard packet sent by the authentication server, the first EAP request message comprising an EAP header and a data portion comprising an identity of the authentication server and a server random nonce;

determining by the wireless device a plurality of -keys based on the PSK, the identity of the authentication server, and the server random nonnce;

determining by the wireless device a first message integrity code (MIC) based on the identity of the authentication server, the server random nonce, and one of the plurality of keys determined based on the PSK;

sending by the wireless device a first EAP response message encapsulated in a wireless personal area network standard packet, the first EAP response message comprising an EAP header and a data portion comprising a client random nonce, a selected cipher suite identity, and the first message integrity code (MIC);

receiving a second EAP request message from the authentication server encapsulated in a wireless personal area network standard packet, the second EAP request message comprising an EAP header and a data portion comprising the third MIC determined by the authentication server based on the selected cipher suite identity and one of the plurality of keys determined based on the PSK;

wherein the second EAP request message is sent by the authentication server after the authentication server determining by a second MIC based on the identity of the authentication server, the server random nonce, and one of the plurality of keys determined based on the PSK, and determining that the wireless device passes authentication based in part on comparing the second MIC with the first MIC contained in the first EAP response message.

16. A method of generating a message encryption key and a message authentication key, comprising:

sending by a wireless device a first extensible authentication protocol (EAP) key message encapsulated in a wireless personal area network standard packet, the first EAP key message comprising an EAP header and a data portion comprising an initiator random nonce and an initiator identity, wherein the first EAP key message is received by a personal area network (PAN) coordinator which generates a plurality of keys based on the initiator random nonce;

receiving by the wireless device a second EAP key message encapsulated in the wireless personal area network standard packet, the second EAP key message comprising an EAP header and a data portion comprising a responder random nonce and a first message integrity code (MIC) based on the initiator random nonce, the responder random nonce, and the keys derived by the PAN coordinator based on the initiator random nonce;

receiving by the wireless device a third EAP key message encapsulated in the wireless personal area network standard packet, the third EAP key message comprising an EAP header and a data portion containing a second MIC; and deriving independently by the wireless device together with the PAN coordinator the encryption key and the message authentication key based on a temporal key (TK), wherein the temporal key is one of the plurality of keys derived based on the initiator random nonce.

17. The method of claim 16, wherein the first, second, and third EAP key messages include a descriptor type field that identifies each message as one of an EAP SAP-1 type message, an EAP SAP-2 type message, and an EAP SAP-3 type message.

* * * * *